(12) United States Patent
Jiang et al.

(10) Patent No.: US 11,949,114 B2
(45) Date of Patent: Apr. 2, 2024

(54) BATTERY BOX

(71) Applicant: CONTEMPORARY AMPEREX TECHNOLOGY CO., LIMITED, Fujian (CN)

(72) Inventors: Liwen Jiang, Fujian (CN); Wumei Fang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 211 days.

(21) Appl. No.: 17/125,998

(22) Filed: Dec. 17, 2020

(65) Prior Publication Data

US 2021/0104798 A1     Apr. 8, 2021

Related U.S. Application Data

(63) Continuation of application No. PCT/CN2019/125990, filed on Dec. 17, 2019.

(30) Foreign Application Priority Data

Dec. 27, 2018 (CN) .......................... 201822224310.8

(51) Int. Cl.
*H01M 50/198* (2021.01)
*H01M 50/209* (2021.01)
(Continued)

(52) U.S. Cl.
CPC ....... *H01M 50/198* (2021.01); *H01M 50/317* (2021.01); *H01M 50/383* (2021.01); *H01M 50/209* (2021.01)

(58) Field of Classification Search
CPC ............. H01M 50/209; H01M 50/198; H01M 50/383; H01M 50/317
See application file for complete search history.

(56) References Cited

U.S. PATENT DOCUMENTS

| 9,318,731 B2 | 4/2016 | Lee et al. | |
| 2003/0232236 A1* | 12/2003 | Mitchell | H01M 50/3425 429/2 |

(Continued)

FOREIGN PATENT DOCUMENTS

| CN | 102088104 A | 6/2011 |
| CN | 203466244 U | 3/2014 |

(Continued)

*Primary Examiner* — Brian R Ohara
*Assistant Examiner* — Emily Elizabeth Freeman
(74) *Attorney, Agent, or Firm* — Scully, Scott, Murphy & Presser, P.C.

(57) ABSTRACT

This application provides a battery box, which includes: a box body, a first battery group and a sealing member, where the first battery group includes: a first battery row including a plurality of batteries, all explosion-proof valves of the first battery row form a first explosion-proof valve row; a first guide plate, configured to be sealed and disposed above the first explosion-proof valve row, and forming a first path with an upper surface of the first battery row; and a first end plate, provided with a first recess communicating with one end of the first path, and an opening is disposed at a position, corresponding to the first recess, of the box body, where the sealing member is configured to seal the opening and be capable of being damaged to open the opening. The battery box of this application effectively exports heat to the outside.

20 Claims, 6 Drawing Sheets

(51) Int. Cl.
*H01M 50/317* (2021.01)
*H01M 50/383* (2021.01)

(56) References Cited

U.S. PATENT DOCUMENTS

| | | | |
|---|---|---|---|
| 2005/0147874 A1* | 7/2005 | Andersen | H01M 50/296 |
| | | | 429/86 |
| 2010/0323228 A1* | 12/2010 | Okamoto | H01M 50/60 |
| | | | 29/623.2 |
| 2011/0104552 A1 | 5/2011 | Kim et al. | |
| 2011/0117401 A1 | 5/2011 | Lee et al. | |
| 2012/0183823 A1* | 7/2012 | Von Borck | H01M 10/653 |
| | | | 429/81 |
| 2013/0330579 A1* | 12/2013 | Ejiri | H01M 50/583 |
| | | | 429/53 |
| 2014/0227569 A1 | 8/2014 | Kim et al. | |
| 2015/0162578 A1 | 6/2015 | Kim et al. | |
| 2015/0280193 A1* | 10/2015 | Ohshiba | H01M 10/658 |
| | | | 361/535 |
| 2018/0138478 A1 | 5/2018 | Chan | |

FOREIGN PATENT DOCUMENTS

| | | | | |
|---|---|---|---|---|
| CN | 204651372 U | | 9/2015 | |
| CN | 209183604 U | | 7/2019 | |
| DE | 102016118753 A1 | | 4/2018 | |
| EP | 2325922 A1 | | 5/2011 | |
| EP | 2328201 A1 | | 6/2011 | |
| JP | 2012079510 A | | 4/2012 | |
| KR | 20080036253 A | * | 4/2008 | |
| WO | WO-2012014348 A1 | * | 2/2012 | ........ H01M 10/0431 |

* cited by examiner

BATTERY BOX

CROSS-REFERENCE TO RELATED APPLICATIONS

This application is a continuation of International Application No. PCT/CN2019/125990, filed on Dec. 17, 2019, which claims priority to Chinese Patent Application No. 201822224310.8, filed on Dec. 27, 2018. The disclosures of the aforementioned applications are hereby incorporated by reference in their entireties.

TECHNICAL FIELD

This application relates to the field of batteries, and in particular, to a battery box.

BACKGROUND

With the vigorous development of new energy vehicles, the demand for power battery system products is increasing. In traditional battery packs, thermal runaway often occurs on an entire battery pack due to temperature rise or damage of one battery. The existing design generally covers the upper part of the battery pack with fireproof cotton to slow down the heat spread of thermal runaway. This method can play a certain protective role, but cannot fundamentally reduce the spread of thermal runaway. Moreover, once the heat spreads or the temperature is too high, the coverage of fireproof cotton will hinder the flow of internal gas, affecting opening and deflation of explosion-proof valves of batteries.

SUMMARY

In view of the problem existing in the background, an objective of this application is to provide a battery box and a vehicle, which can export gas production and heat inside a battery to the outside when the battery fails, preventing heat from spreading and improving safety of a battery pack.

To achieve the foregoing objective, this application provides a battery box, which includes: a box body including a closed accommodation space; and a first battery group accommodated in the accommodation space. The first battery group includes a first battery row, where the first battery row includes a plurality of batteries arranged side by side along a width direction, an explosion-proof valve is disposed on the top of each battery, and all explosion-proof valves of the first battery row form a first explosion-proof valve row; a first guide plate, configured to extend along the width direction and be sealed and disposed above the first explosion-proof valve row, where the first guide plate and an upper surface of the first battery row form a first path extended along the width direction; and a first end plate, disposed on one side in the width direction of the first battery row and provided with a first recess, where the first recess is located below the first guide plate in a height direction and communicates with one end of the first path, and an opening is disposed at a position, corresponding to the first recess, of the box body. The battery box further includes: a sealing member, configured to seal an opening corresponding to the box body and be capable of being damaged to open the opening.

In an embodiment, the first battery group further includes: a second end plate, disposed on the other side in the width direction of the first battery row and provided with a second recess, where the second recess is located below the first guide plate in the height direction and communicates with the other end of the first path, and an opening is disposed at a position, corresponding to the second recess, of the box body.

In an embodiment, the first battery group has more than two first battery rows arranged side by side along a length direction; a quantity of the first guide plates is more than two, and each of the first guide plates is sealed and disposed above a corresponding first explosion-proof valve row and forms a first path with an upper surface of a corresponding first battery row; the first end plate has more than two first recesses, and each of the first recesses communicates with one end of a corresponding first path; and the second end plate has more than two second recesses, and each of the second recesses communicates with the other end of a corresponding first path.

In an embodiment, the battery box further includes: a second battery group, where the second battery group and the first battery group arranged side by side along the width direction. The second battery group includes: a second battery row, where the second battery row includes a plurality of batteries arranged side by side along the width direction, an explosion-proof valve is disposed on the top of each battery, and all explosion-proof valves of the second battery row form a second explosion-proof valve row; a second guide plate, configured to extend along the width direction and be sealed and disposed above the second explosion-proof valve row, where the second guide plate and an upper surface of the second battery row form a second path extended along the width direction; and a third end plate, disposed on one side in the width direction of the second battery row and provided with a third recess, where the third recess is located below the second guide plate in the height direction and communicates with one end of the second path, and an opening is disposed at a position, corresponding to the third recess, of the box body. One end, adjacent to the first battery group, of the second path is closed; and one end, adjacent to the second battery group, of the first path is closed.

In an embodiment, a quantity of the first battery groups arranged in the length direction is more than two, and a quantity of the second battery groups arranged in the length direction is more than two. The battery box further includes: a first beam, disposed between two adjacent first battery groups and two adjacent second battery groups; and a second beam, sandwiched between the first battery group and the second battery group along the width direction, where the first beam and the second beam divide the accommodation space into a plurality of subspaces, and each of the first battery groups and each of the second battery groups are respectively accommodated in corresponding subspaces.

In an embodiment, the first guide plate includes: a main body; side portions, connected to both sides of the main body along the length direction and extending along the first battery row; and fixing portions, connected to the side portions and extending outward along the length direction, where the fixing portions are sealed and fixed on the upper surface of the first battery row.

In an embodiment, the first guide plate further includes: a stop portion, disposed at one end of the main body along the width direction and connected to the ends of the main body, the side portions and the fixed portions.

In an embodiment, an adsorption material is provided in the first path formed by the first guide plate and the upper surface of the first battery row.

In an embodiment, the box body includes: a lower box body; and an upper box body, configured to be sealed and installed on the lower box body along the height direction and enclose the accommodation space with the lower box body. The lower box includes: a bottom wall; a first peripheral wall, connected to the periphery of the bottom wall and extending in the direction of the upper box; and a first flange, connected to the first peripheral wall and extending outward along an upper edge of the first peripheral wall. The upper box includes: a top wall; a second peripheral wall, connected to the periphery of the top wall and extending in the direction of the lower box; and a second flange, connected to the second peripheral wall and extending outward along the lower edge of the second peripheral wall. The upper box is installed on the lower box along the height direction, and the second flange of the upper box is sealingly connected with the first flange of the lower box.

In an embodiment, a portion of the second flange of the upper box bulges upward in the height direction to form a corresponding opening with the first flange of the lower box.

The beneficial effects of this application are as follows: In the battery box according to this application, the first path, the first recess, and the opening are disposed to provide a discharge passage for gas production and heat in a battery when the battery fails, so that internal gas production and heat are exported to the outside, avoiding the risk of thermal runaway caused by accumulation of the gas production and heat in the box body and improving safety performance of the battery box.

Figure 1:
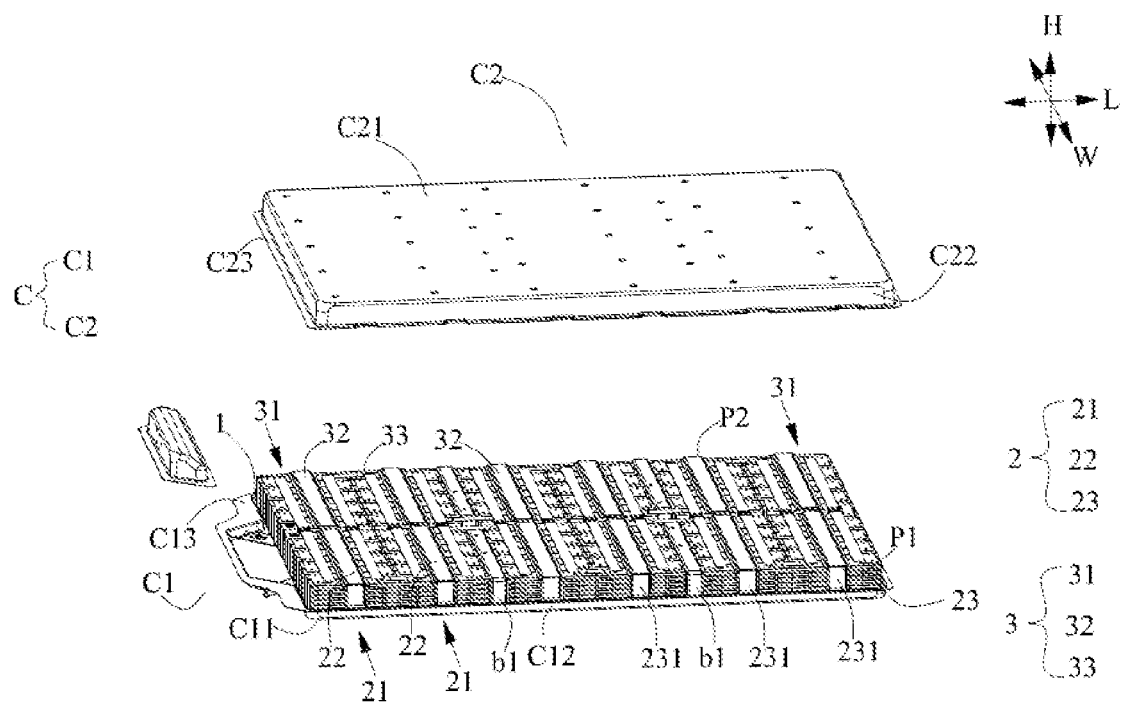
FIG. 1 is a three-dimensional exploded view of a battery box according to this application.
Figure 2:
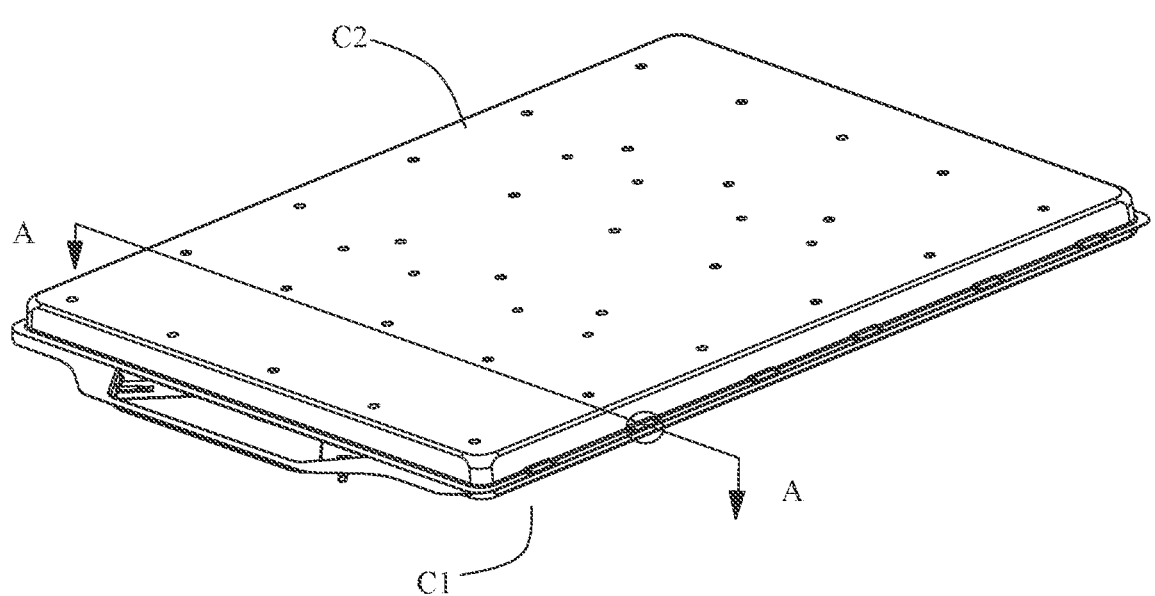
FIG. 2 is an assembly diagram of FIG. 1.

Reference numerals in the accompanying drawings are described as follows:

C. box body;
C1. lower box;
C11. bottom wall;
C12. first peripheral wall;
C13. first flange;
C2. upper box;
C21. top wall;
C22. second peripheral wall;
C23. second flange;
1. accommodation space;
2. first battery group;
21. first battery row;
B. battery;
V. explosion-proof valve;
211. first explosion-proof valve row;
22. first guide plate;
221. main body;
222. side portion;
223. fixed portion;
224. stop portion;
P1. first path;
23. first end plate;
231. first recess;
24. second end plate;
241. second recess;
O. opening;
S. sealing member;
b1. first beam;
b2. second beam;
3. second battery group;
31. second battery row;
311. second explosion-proof valve row;
32. second guide plate;
P2. second path;
33. third end plate;
331. third recess;
L. length direction;
H. height direction; and
W. width direction.

DESCRIPTION OF EMBODIMENTS

The drawings illustrate embodiments of this application, it will be understood that the disclosed embodiments are merely examples of this application, and this application may be implemented in various forms. Therefore, the specific details disclosed in this specification should not be construed as limiting, but are intended only as a basis for the claims and as an illustrative basis for guiding a person of ordinary skill in the art to implement this application in various ways.

In addition, expressions of indicating directions such as the length direction, the height direction, and the width direction for explaining the operation and construction of each member of a battery box in this embodiment are not absolute but relative. In addition, although these indications are appropriate when the members of the battery box are in the positions shown in the figures, when these positions change, these directions should be interpreted differently to correspond to the changes.

As shown in FIG. 1 to FIG. 4, the battery box according to this application includes: a box body C, a first battery group 2, and a sealing member S. The battery box may further include a second battery group 3, a first beam b1, and a second beam b2.

The box body C includes: a lower box C1; and an upper box C2, configured to be sealed and installed on the lower box C1 along a height direction H and enclose an accommodation space 1 with the lower box C1.

The lower box C1 includes: a bottom wall C11; a first peripheral wall C12, connected to the periphery of the bottom wall C11 and extending in the direction of the upper box C2; and a first flange C13, connected to the first peripheral wall C12 and extending outward along an upper edge of the first peripheral wall C12.

The upper box C2 includes: a top wall C21; a second peripheral wall C22, connected to the periphery of the top wall C21 and extending in the direction of the lower box C1 direction; and a second flange C23, connected to the second peripheral wall C22 and extending outward along the lower edge of the second peripheral wall C22. The upper box C2 is installed on the lower box C1 along the height direction H, and the second flange C23 of the upper box C2 is sealingly connected with the first flange C13 of the lower box C1.

Specifically, there are various embodiments of the combination of the first battery group 2, the second battery group 3, the first beam b1 and the second beam b2 in the battery box, which will be described in detail below according to different embodiments.

Figure 5:
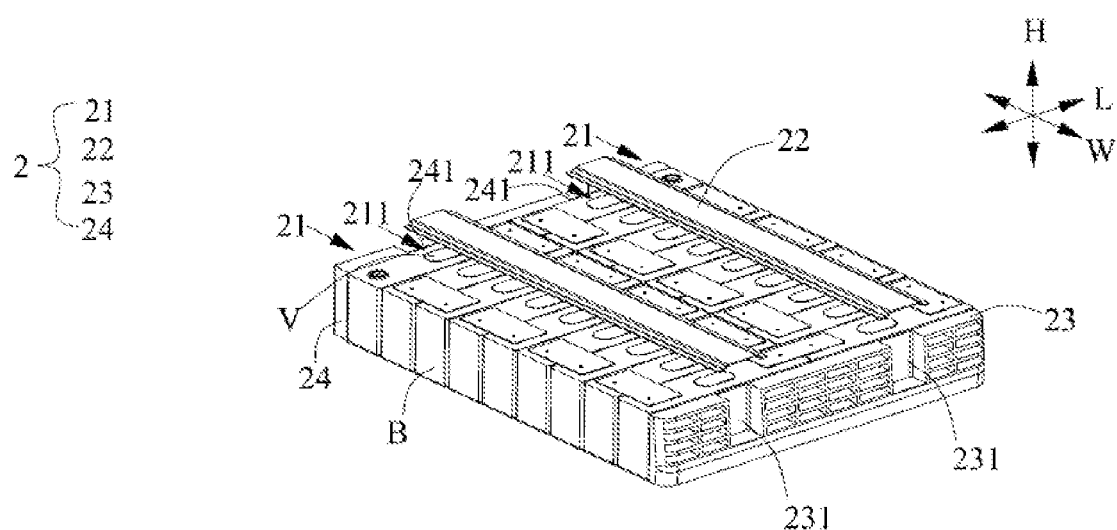
FIG. 5 is a three-dimensional diagram of an embodiment of a battery box according to this application, where no box body is shown.
Figure 8:
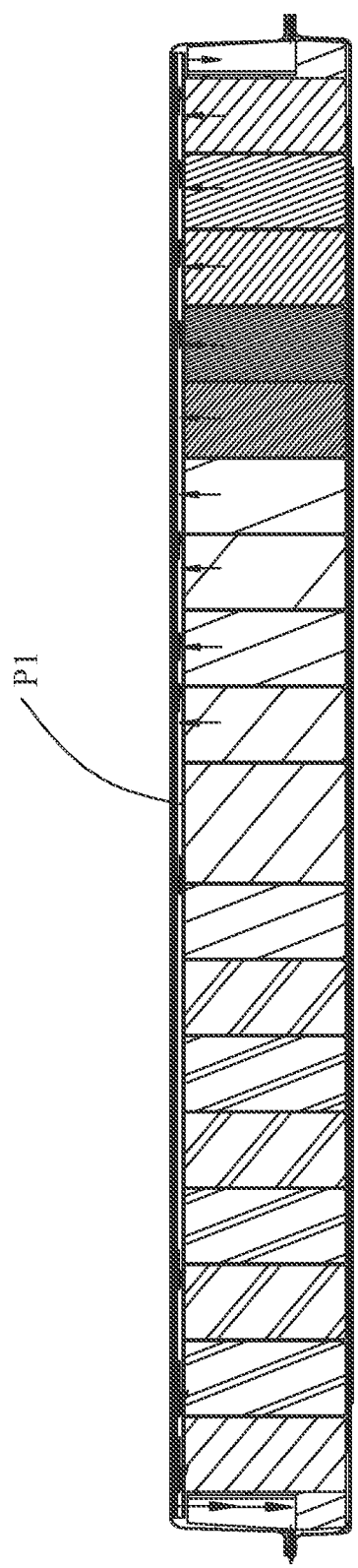
FIG. 8 is a section view of another embodiment similar to that of FIG. 7.

In a first embodiment, as shown in FIG. 5 and FIG. 8, the accommodation space 1 of the box body C accommodates the first battery group 2.

The first battery group 2 includes a first battery row 21, a first guide plate 22, a first end plate 23, and a second end plate 24. The first guide plate 22 is located above the first battery row 21; and the first end plate 23 and the second end plate 24 are disposed on both sides of the first battery row 21 in a width direction W.

The first battery row 21 includes a plurality of batteries B arranged side by side along the width direction W, an explosion-proof valve V is disposed on the top of each battery, and all the explosion-proof valves V of the first battery row 21 form a first explosion-proof valve row 211. The first guide plate 22 is configured to extend along the width direction W and be sealed and disposed above the first explosion-proof valve row 211, and the first guide plate 22 and an upper surface of the first battery row 21 form a first path P1 extended along the width direction W.

The first guide plate 22 includes: a main body 221; side portions 222, connected to both sides of the main body 221 along a length direction L and extending along the first battery row 21; and fixing portions 223, connected to the side portions 222 and extending outward along the length direction L, where the fixing portions 223 are sealed and fixed on an upper surface of the first battery row 21. The fixing portions 223 may be bonded to the upper surface of the first battery row 21 via a structural adhesive. Of course, there are another fixing manner, which may be selected according to a specific situation. The first guide plate 22 is formed by integral stamping. The first guide plate 22 is simple to form and easy to install.

Figure 3:
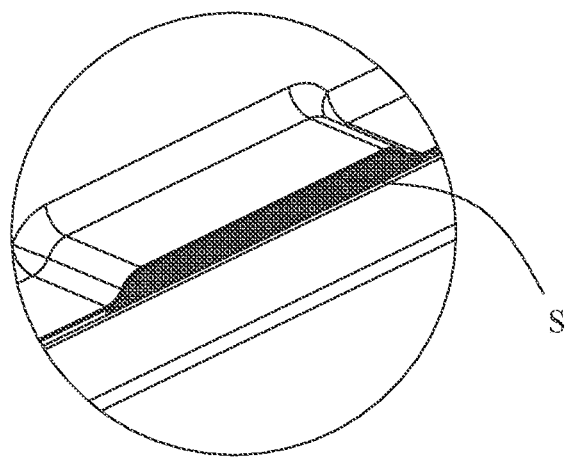
FIG. 3 is a locally enlarged view of FIG. 2.
Figure 4:
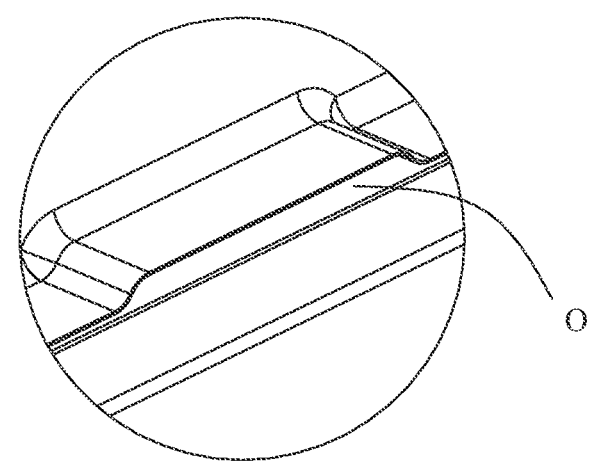
FIG. 4 is a view similar to FIG. 3 with no sealing member shown.

The first end plate 23 is disposed on one side in the width direction W of the first battery row 21 and provided with a first recess 231, the first recess 231 is located below the first guide plate 22 in a height direction H and communicates with one end of the first path P1, and an opening O is disposed at a position, corresponding to the first recess 231, of the box body C. The second end plate 24 is disposed on the other side in the width direction W of the first battery row 21 and provided with a second recess 241, the second recess 241 is located below the first guide plate 22 in the height direction H and communicates with the other end of the first path P1, and an opening O is disposed at a position, corresponding to the second recess 241, of the box body C. The first recess 231 of the first end plate 23 is recessed inwardly from a surface on a side facing away from the first battery row 21 and extends to an upper surface of the first end plate 23 in the height direction H so as to communicate with the first path P1 formed by the first guide plate 22. The second end plate 24 has a same structure as the first end plate 23. As shown in FIG. 4, a portion of the second flange C23 of the upper box C2 bulges upward in the height direction H to form a corresponding opening O with the first flange C13 of the lower box C1. Of course, the manner in which the opening O is formed is not limited thereto. For example, a portion of the second flange C23 of the upper box C2 bulges upward in the height direction H and the corresponding portion of the first flange C13 of the lower box C1 bulges downward in the height direction H and the two are engaged to form an opening O; or the corresponding portion of the first flange C13 of the lower box C1 bulges downward in the height direction H and engages with the second flange C23 of the upper box C2 to form an opening O. A specific formation manner can be selected according to a specific situation. Generally, when a battery B fails, gas production inside the battery B will break through the explosion-proof valve V, gas and heat will be rushed out, and some steam also be carried. The gas, heat and steam are collectively referred to as gas production in this specification. Pressure and heat of the gas production are relatively high, while a sealing member 3 can be damaged by the pressure or high temperature of the gas production, thus opening the opening O. As shown in FIG. 3, the sealing member S is configured to seal an opening O corresponding to the box body C and be capable of being damaged to open the opening O. It should be noted that the damage of the sealing member S is usually caused by the reason as follows: When the battery B fails, a large amount of gas and heat will be generated inside the battery B; when the gas and heat accumulate to a certain extent, the explosion-proof valve V of the battery B will be broken; the gas and heat that rush out of the explosion-proof valve V will be exported to the opening O along the first path P1, and the sealing member S can be broken out by pressure of the exported gas or melted by the heat, thus causing the sealing member S to be damaged and the opening O to be opened. Preferably, the sealing member S is a bonding adhesive. An adsorption material is provided in the first path P1 formed by the first guide plate 22 and the upper surface of the first battery row 21. The adsorption material includes a mixture of sodium bicarbonate, ammonium phosphate, and the like.

In this embodiment, as shown in FIG. 8, when the explosion-proof valve V of the battery B is broken due to gas production inside the battery B, the part where the explosion-proof valve V of the battery B is broken, the first path P1, the first recess 231 of the first end plate 23, the second recess 241 of the second end plate 24, and the opening O of the box body form a communicating exhaust passage. The gas production and heat released through the broken explosion-proof valve V inside the battery B are exported to the openings O on both sides of the box body C through the exhaust passage. When the gas reaches a certain pressure, the gas breaks through the sealing member S or the high-temperature heat carried by the gas melts the sealing member S so as to discharge the gas production and heat to the outside, thus preventing accumulation of the gas production and heat of the battery B in the box body C from causing thermal runaway of another component such as another battery B, preventing spread of thermal runaway, and improving safety performance of the battery box. In addition, the adsorption material can play a role in flame retardant and temperature reduction, and play a role in assisting in reducing thermal runaway diffusion. In addition, the adsorption material can absorb moisture and prevent water vapor from accumulating in the first path P1.

In the first embodiment, the first battery group 2 has more than two first battery rows 21 arranged side by side along a length direction L; there are more than two first guide plates 22, and each of the first guide plates 22 is sealed and disposed above a corresponding first explosion-proof valve row 211 and forms a first path P1 with an upper surface of a corresponding first battery row 21; the first end plate 23 has more than two first recesses 231, and each of the first recesses 231 communicates with one end of a corresponding first path P1; and the second end plate 24 has more than two second recesses 241, and each of the second recesses 241 communicates with the other end of a corresponding first path P1. In this embodiment, two first battery rows 21 of the first battery group 2 are shown in FIG. 5, but of course a quantity of the first battery rows 21 are not limited to two. The quantity of the first battery rows 21 of the first battery group 2 may alternatively be one or more than two, and the exhaust path is designed in a same manner regardless of one or more than two. Details are not described herein again.

In a second embodiment (not shown), the difference from the first embodiment is that there are more than two first battery groups 2 arranged in the length direction L, and the battery box further includes a first beam b1 sandwiched between two adjacent first battery groups 2 and dividing an accommodation space 1 of a box body C into more than two subspaces, and each of the first battery groups 2 is accommodated in a corresponding subspace. A design of the exhaust path and a function of the exhaust path of each battery group 2 are the same as those in the first embodiment. Details are not described herein again. It should be noted that a design of the first beam b1 can increase overall strength of the box body C. In addition, the subspace divided by the first beam b1 is preferably a sealed space, and each of the first battery groups 2 is accommodated in a sealed space. If thermal runaway occurs on a battery B in one of the subspaces, high-temperature or high-pressure gas will not diffuse into the remaining sealed space, further preventing the spread of thermal runaway and further improving safety performance of the battery box.

Figure 6:
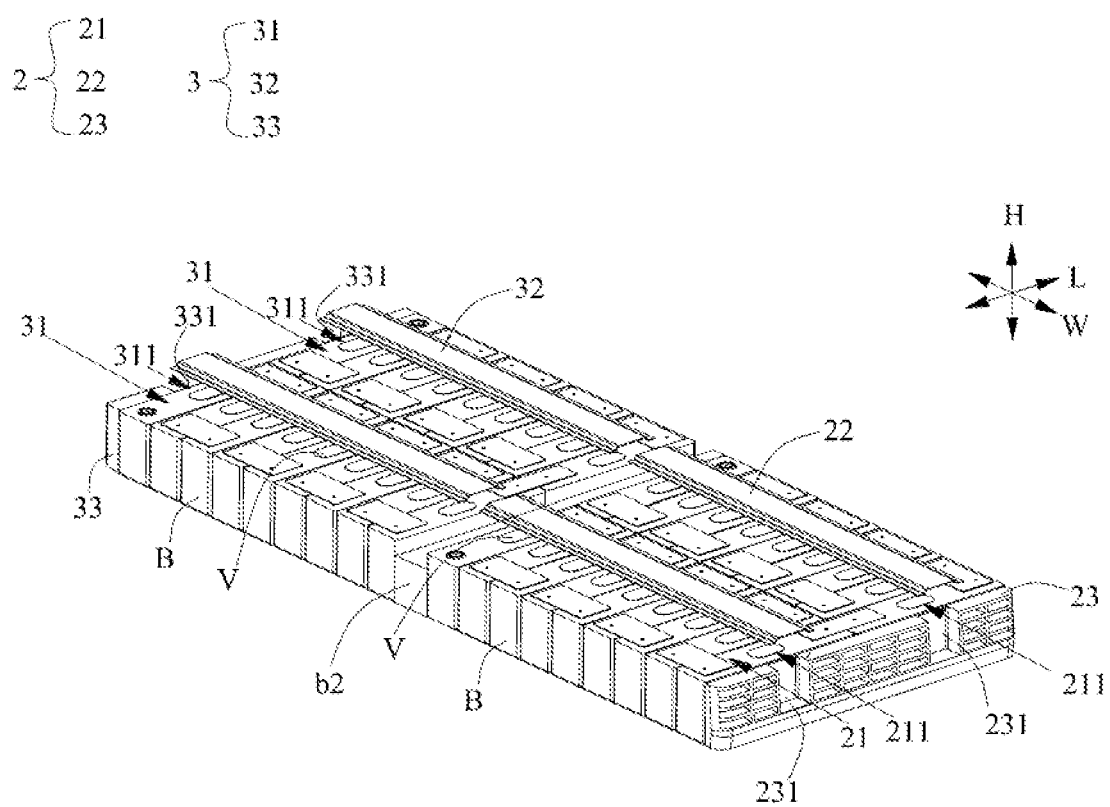
FIG. 6 is a three-dimensional diagram of another embodiment similar to FIG. 5, with no box body shown.
Figure 7:
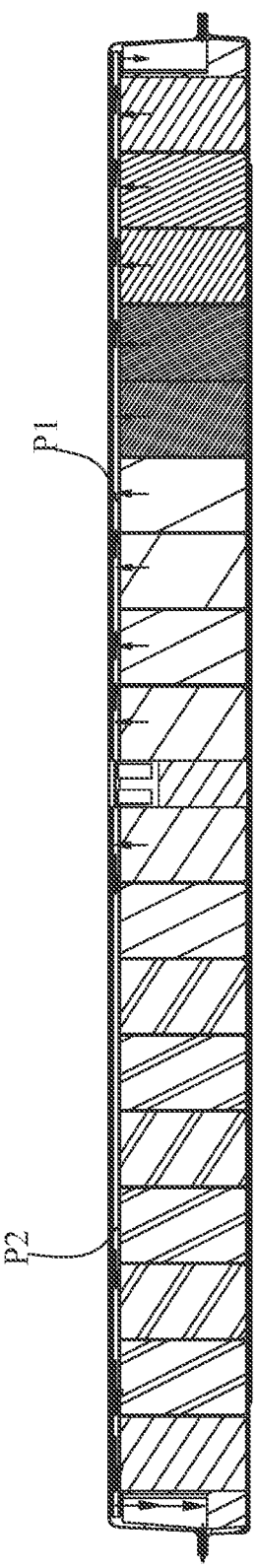
FIG. 7 is a section view along the line A-A of FIG. 2.

In a third embodiment, as shown in FIG. 6 and FIG. 7, a first battery group 2 includes a first battery row 21, a first guide plate 22, and a first end plate 23. A battery box further includes a second battery group 3, where the second battery group 3 and a first battery group 2 are arranged side by side along a width direction W, and the second battery group 3 includes a second battery row 31, a second guide plate 32, and a third end plate 33.

Figure 9:
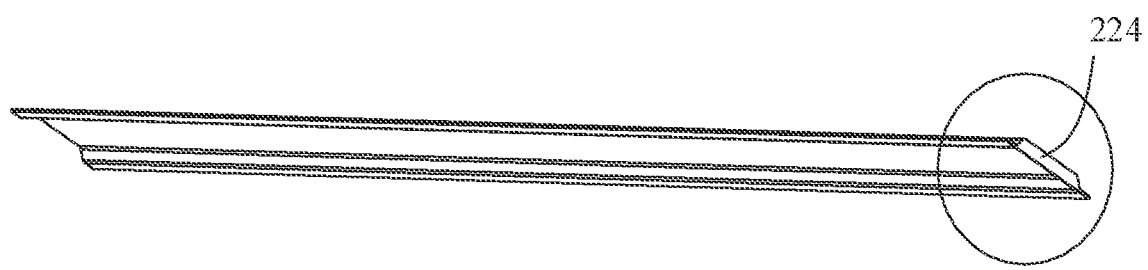
FIG. 9 is a three-dimensional diagram of an embodiment of a first guide plate.
Figure 10:
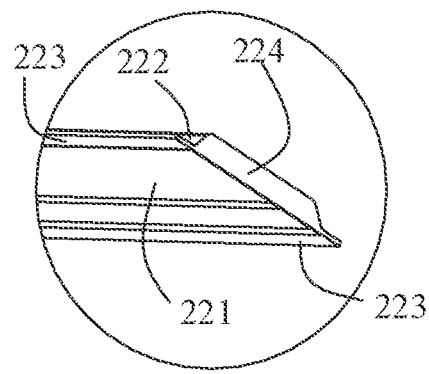
FIG. 10 is a locally enlarged view of FIG. 9.

In this embodiment, as shown in FIGS. 9 and 10, the first guide plate 22 includes: a main body 221; side portions 222, connected to both sides of the main body 221 along a length direction L and extending along the first battery row 21; and fixing portions 223, connected to the side portions 222 and extending outward along the length direction L, where the fixing portions 223 are sealed and fixed on an upper surface of the first battery row 21. The first guide plate 22 further includes: a stop portion 224, disposed at one end of the main body 221 along the width direction W and connected to the ends of the main body 221, the side portions 222, and the fixed portions 223, so that a first path P1 formed by the first guide plate 22 and an upper surface of the first battery row 21 is closed at one end adjacent to the second battery group 3 and exhausts air on the side close to a box body C. In addition, the first battery row 21 and the first end plate 23 of the first battery group 2 are disposed in a same manner as that in the first embodiment. Details are not described herein again. The stop portion 224 may be welded to the ends of the main body 221, the side portions 222, and the fixing portions 223, or may be integrally formed with the main body 221, the side portions 222, and the fixing portions 223.

The second battery row 31 includes a plurality of batteries B arranged side by side along the width direction W, an explosion-proof valve V is disposed on the top of each battery B, and all explosion-proof valves V of the second battery row 31 form a second explosion-proof valve row 311.

The second guide plate 32 is configured to extend along the width direction W and be sealed and disposed above the second explosion-proof valve row 311, and the second guide plate 32 and an upper surface of the second battery row 31 form a second path P2 extended along the width direction W.

The second guide plate 32 has a same structure as the first guide plate 22. An adsorption material is also provided in the second path P2 formed by the second guide plate 32 and the upper surface of the second battery row 31.

The third end plate 33 is disposed on one side in the width direction W of the second battery row 31 and provided with a third recess 331, where the third recess 331 is located below the second guide plate 32 in the height direction H and communicates with one end of the second path P2, and an opening O is disposed at a position, corresponding to the third recess 331, of the box body C. One end, adjacent to the first battery group 2, of the second path P2 is closed; and one end, adjacent to the second battery group 3, of the first path P1 is closed.

When an explosion-proof valve V of a corresponding battery B is broken by gas production inside the battery B, the gas production and heat of the battery B are discharged to the outside of the box body C through the explosion-proof valve V, a corresponding first path P1 or second path P2, a corresponding first recess 231 or second recess 241, and a corresponding opening O, thus preventing accumulation of the gas production and heat of the battery B in the box body C from causing thermal runaway of another component such as another battery B, preventing spread of thermal runaway, and improving safety performance of the battery box. In addition, the adsorption material can play a role in flame retardant and temperature reduction, and play a role in assisting in reducing thermal runaway diffusion. In addition, the adsorption material can absorb moisture and prevent water vapor from accumulating in the first path P1 or the second path P2.

In a fourth embodiment, as shown in FIG. 1, there are more than two first battery groups 2 arranged in a length direction L, and there are more than two second battery groups 3 arranged in the length direction L. A battery box further includes: a first beam b1, disposed between two adjacent first battery groups 2 and two adjacent second battery groups 3; and a second beam b2, sandwiched between the first battery group 2 and the second battery group 3 along a width direction W, where the first beam b1 and the second beam b2 divide an accommodation space 1 into a plurality of subspaces, and each of the first battery groups 2 and each of the second battery groups 3 are respectively accommodated in corresponding subspaces. Preferably, the subspace is a closed space. This embodiment is different from the third embodiment in the quantity of the first battery group 2 and the second battery group 3, and a specific exhaust manner is the same as that described above. Details are not described herein again. In addition, the arrangement of the first beam b1 and the second beam b2 improves overall strength of the battery box, and an accommodation space is divided into a plurality of closed subspaces, preventing spread and diffusion of thermal runaway and improving safety performance of the battery box.

The above detailed descriptions describe a plurality of exemplary embodiments, but is not intended to be limited to explicitly disclosed combinations in this specification. Therefore, unless otherwise specified, the various features disclosed in this specification may be combined to form a plurality of additional combinations not shown for the sake of brevity.

What is claimed is:

1. A battery box, comprising: a box body comprising a closed accommodation space; and a first battery group accommodated in the closed accommodation space, wherein the first battery group comprises:

a first battery row, wherein the first battery row comprises a plurality of batteries arranged side by side along a width direction, an explosion-proof valve is disposed on the top of each battery, and all explosion-proof valves of the first battery row form a first explosion-proof valve row;

a first guide plate, configured to extend along the width direction and be sealed and disposed above the first explosion-proof valve row, wherein the first guide plate and an upper surface of the first battery row form a first path extended along the width direction; and a first end plate, disposed on one side in the width direction of the first battery row and provided with a first recess, wherein the first recess is located below the first guide plate in a height direction and communicates with one end of the first path, the first recess is recessed inwardly from a surface on a side facing away from the first battery row and extends to an upper surface of the first end plate in the height direction so as to communicate with the first path formed by the first guide plate, and an opening is disposed at a position corresponding to the first recess of the box body, when an explosion-proof valve of the first explosion-proof valve row is broken due to gas production inside the battery, emissions discharged from the broken explosion-proof valve is transmitted by the first path to a space between the first recess and the box body, and then discharged to the outside of the box body through the opening corresponding to the first recess of the box body; wherein the battery box further comprises: a sealing member, wherein the sealing member is configured to seal an opening corresponding to the box body and is capable of being damaged by the emissions to open the opening.

2. The battery box according to claim 1, wherein the battery box further comprises: a second battery group, wherein the second battery group and the first battery group are arranged side by side along the width direction, and the second battery group comprises:

a second battery row, wherein the second battery row comprises a plurality of batteries arranged side by side along the width direction, an explosion-proof valve is disposed on the top of each battery, and all explosion-proof valves of the second battery row form a second explosion-proof valve row;

a second guide plate, configured to extend along the width direction and be sealed and disposed above the second explosion-proof valve row, wherein the second guide plate and an upper surface of the second battery row form a second path extended along the width direction; and a third end plate, disposed on one side in the width direction of the second battery row and provided with a third recess, wherein the third recess is located below the second guide plate in the height direction and communicates with one end of the second path, the third recess is recessed inwardly from a surface on a side facing away from the second battery row and extends to an upper surface of the third end plate in the height direction so as to communicate with the second path formed by the second guide plate, and an opening is disposed at a position corresponding to the third recess of the box body, when an explosion-proof valve of the second explosion-proof valve row is broken due to gas production inside the battery, emissions discharged from the broken explosion-proof valve is transmitted by the second path to a space between the third recess and the box body, and then discharged to the outside of the box body through the opening corresponding to the third recess of the box body.

3. The battery box according to claim 2, wherein one end, adjacent to the first battery group, of the second path is closed; and one end, adjacent to the second battery group, of the first path is closed.

4. The battery box according to claim 3, wherein a quantity of the first battery groups arranged in the length direction is more than two, and a quantity of the second battery groups arranged in the length direction is more than two.

5. The battery box according to claim 4, wherein the battery box further comprises:

a first beam, disposed between two adjacent first battery groups and two adjacent second battery groups.

6. The battery box according to claim 5, wherein the battery box further comprises:

a second beam, sandwiched between the first battery group and the second battery group along the width direction.

7. The battery box according to claim 6, wherein the first beam and the second beam divide the closed accommodation space into a plurality of subspaces, and each of the first battery groups and each of the second battery groups are respectively accommodated in corresponding subspaces.

8. The battery box according to claim 1, wherein the first guide plate comprises: a main body; side portions, connected to both sides of the main body along the length direction and extending along the first battery row; and fixing portions, connected to the side portions and extending outward along the length direction, wherein the fixing portions are sealed and fixed on the upper surface of the first battery row.

9. The battery box according to claim 8, the first guide plate further comprises: a stop portion, disposed at one end of the main body along the width direction and connected to the ends of the main body, the side portions and the fixed portions.

10. The battery box according to claim 8, wherein the fixing portions are bonded to the upper surface of the first battery row via a structural adhesive.

11. The battery box according to claim 1, wherein an adsorption material is provided in the first path formed by the first guide plate and the upper surface of the first battery row.

12. The battery box according to claim 1, wherein the sealing member is a bonding adhesive.

13. The battery box according to claim 1, wherein the first battery group further comprises:

a second end plate, wherein the second end plate is disposed on the other side in the width direction of the first battery row and is provided with a second recess, the second recess is located below the first guide plate in the height direction and communicates with the other end of the first path, the second recess is recessed inwardly from a surface on a side facing away from the first battery row and extends to an upper surface of the second end plate in the height direction so as to communicate with the first path formed by the first guide plate, and an opening is disposed at a position corresponding to the second recess of the box body, when the explosion-proof valve of the first explosion-proof valve row is broken due to gas production inside the battery, emissions discharged from the broken explosion-proof valve is transmitted by the first path to a space between the first recess and the box body and to a space between the second recess and the box body, and then discharged to the outside of the box body through the opening corresponding to the first recess of the box body and the opening corresponding to the second recess.

14. The battery box according to claim 13, wherein the first battery group has more than two first battery rows arranged side by side along a length direction; a quantity of the first guide plates is more than two, and each of the first guide plates is sealed and disposed above a corresponding first explosion-proof valve row and forms a first path with an upper surface of a corresponding first battery row.

15. The battery box according to claim 14, wherein the first end plate has more than two first recesses, and each of the first recesses communicates with one end of a corresponding first path; and the second end plate has more than two second recesses, and each of the second recesses communicates with the other end of a corresponding first path.

16. The battery box according to claim 1, wherein the box body comprises: a lower box body; and an upper box body, configured to be sealed and installed on the lower box body along the height direction and enclose the closed accommodation space with the lower box body.

17. The battery box according to claim 16, wherein the lower box comprises: a bottom wall; a first peripheral wall, connected to the periphery of the bottom wall and extending in the direction of the upper box; and a first flange, connected to the first peripheral wall and extending outward along an upper edge of the first peripheral wall; and the upper box comprises: a top wall; a second peripheral wall, connected to the periphery of the top wall and extending in the direction of the lower box; and a second flange, connected to the second peripheral wall and extending outward along the lower edge of the second peripheral wall, wherein the upper box is installed on the lower box along the height direction, and the second flange of the upper box is sealingly connected with the first flange of the lower box.

18. The battery box according to claim 17, wherein a portion of the second flange of the upper box bulges upward in the height direction to form a corresponding opening with the first flange of the lower box.

19. The battery box according to claim 17, wherein a portion of the second flange of the upper box bulges upward in the height direction and the corresponding portion of the first flange of the lower box bulges downward in the height direction to form a corresponding opening.

20. The battery box according to claim 17, wherein a portion of the first flange of the lower box bulges downward in the height direction and engages with the second flange of the upper box to form a corresponding opening.

\* \* \* \* \*